United States Patent
Nakabayashi et al.

(10) Patent No.: US 8,972,790 B2
(45) Date of Patent: Mar. 3, 2015

(54) MEMORY CONTROLLER AND MEMORY ACCESS SYSTEM WITH ERROR DETECTION USING DATA COMPARISON OF LOOP-BACKED SIGNALS

(71) Applicant: Panasonic Corporation, Osaka (JP)

(72) Inventors: Hisataka Nakabayashi, Hyogo (JP); Miho Takeda, Kyoto (JP); Masanori Ito, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 222 days.

(21) Appl. No.: 13/743,073

(22) Filed: Jan. 16, 2013

(65) Prior Publication Data
US 2013/0173966 A1    Jul. 4, 2013

Related U.S. Application Data

(63) Continuation of application No. PCT/JP2011/002480, filed on Apr. 27, 2011.

(30) Foreign Application Priority Data

Jul. 23, 2010  (JP) ................... 2010-166472

(51) Int. Cl.
*G06F 11/00*  (2006.01)
*G11C 11/34*  (2006.01)
*G11C 16/04*  (2006.01)
*G06F 7/02*   (2006.01)
(Continued)

(52) U.S. Cl.
CPC ............ *G06F 11/26* (2013.01); *G06F 13/1673* (2013.01); *G06F 11/24* (2013.01)

USPC .................. 714/37; 365/189.05; 365/189.07; 714/819

(58) Field of Classification Search
CPC .................................................. G01R 31/31716
USPC ............................................. 714/34, 37, 819
See application file for complete search history.

(56) References Cited

U.S. PATENT DOCUMENTS 5,150,386 A *  9/1992  Stern et al. .................. 375/371
6,707,756 B2 *  3/2004  Amidi ........................ 365/189.2
(Continued)

FOREIGN PATENT DOCUMENTS

| JP | 2007-287218 A | 11/2007 |
| JP | 2008-210487 A | 9/2008 |
| JP | 2010-079520 A | 4/2010 |

OTHER PUBLICATIONS

International Search Report issued in International Patent Application No. PCT/JP2011/002480 mailed Jul. 5, 2011.

*Primary Examiner* — Scott Baderman
*Assistant Examiner* — Paul Contino
(74) *Attorney, Agent, or Firm* — McDermott Will & Emery LLP (57) ABSTRACT

A controller section outputs a first signal and a second signal holding a phase relationship with the first signal. The second signal is received by a memory I/F section via a FIFO memory of an error detecting section. The memory I/F section performs timing adjustment for the first and second signals, outputs the first and second signals after the timing adjustment to a memory, and loops back the second signal. A data comparator compares the looped-back second signal with the original second signal outputted from the FIFO memory and corresponding to the looped-back signal.

6 Claims, 6 Drawing Sheets

(51) Int. Cl.
*G06F 11/26* (2006.01)
*G06F 13/16* (2006.01)
*G06F 11/24* (2006.01)

(56) References Cited

U.S. PATENT DOCUMENTS

| | | | |
|---|---|---|---|
| 6,928,593 B1 * | 8/2005 | Halbert et al. | 714/718 |
| 7,143,312 B1 * | 11/2006 | Wang et al. | 714/30 |
| 7,567,073 B2 * | 7/2009 | Hori | 324/76.54 |
| 7,586,955 B2 * | 9/2009 | Iizuka | 370/516 |
| 7,596,729 B2 * | 9/2009 | Adsitt | 714/723 |
| 7,773,676 B2 * | 8/2010 | Chung | 375/240.25 |
| 7,836,372 B2 * | 11/2010 | Bodrozic et al. | 714/743 |
| 8,386,737 B2 * | 2/2013 | Jeon et al. | 711/167 |
| 2005/0135167 A1 * | 6/2005 | Manabe | 365/201 |
| 2006/0156133 A1 * | 7/2006 | Mukherjee et al. | 714/733 |
| 2007/0230509 A1 * | 10/2007 | To et al. | 370/503 |
| 2007/0291830 A1 | 12/2007 | Hori | |
| 2008/0080268 A1 * | 4/2008 | Ha et al. | 365/191 |
| 2008/0181047 A1 * | 7/2008 | Haraguchi et al. | 365/233.13 |
| 2008/0205170 A1 | 8/2008 | Ikeda | |
| 2008/0270856 A1 * | 10/2008 | Matsubayashi | 714/726 |
| 2010/0023839 A1 | 1/2010 | Uneme | |
| 2010/0146237 A1 * | 6/2010 | Takai | 711/167 |
| 2010/0205386 A1 * | 8/2010 | Yamashita | 711/154 |

* cited by examiner

MEMORY CONTROLLER AND MEMORY ACCESS SYSTEM WITH ERROR DETECTION USING DATA COMPARISON OF LOOP-BACKED SIGNALS

CROSS-REFERENCE TO RELATED APPLICATION

This is a continuation of PCT International Application PCT/JP2011/002480 filed on Apr. 27, 2011, which claims priority to Japanese Patent Application No. 2010-166472 filed on Jul. 23, 2010. The disclosures of these applications including the specifications, the drawings, and the claims are hereby incorporated by reference in their entirety.

BACKGROUND

The present disclosure relates to memory access systems, and more particularly to a technology for detecting a data transfer error occurring when accessing a memory.

In recent memory systems, with increased capacity and higher data processing speed, a double data rate synchronous dynamic random access memory (DDR-SDRAM) has been mainly used. In DDR-SDRAMs, a data signal (DQ) can be transferred in synchronization with both rising and falling edges of a data strove signal (DQS), and thus, data transfer at a data rate that is twice the data rate of conventional SDRAMs is possible.

In the DDR specification, bidirectional data signal and data strobe signal are used as standards, and an operation (a write operation) for transmitting data to a DDR-SDRAM and an operation (a read operation) for receiving data from the DDR-SDRAM are performed. In view of supporting high speed data access, importance is put on optimizing the data strobe signal in both write and read operations. In a read operation, in particular, a data signal and a data strobe signal transmitted from the DDR-SDRAM are substantially in phase with each other, and therefore, it is necessary to generate a data strobe signal out of phase by 90 degree relative to a data signal and find a timing adjustment point where data can be stably latched.

In a write operation, it is necessary to appropriately adjust a timing relationship between a command signal and a clock signal to a memory and a timing relationship with which the data signal is latched using the data strobe signal. On the other hand, in the read operation, it is necessary to appropriately adjust a timing relationship with which the data signal is latched using the data strobe signal. For such timing adjustment, for example, in Japanese Patent Publication No. 2008-210487, a configuration in which a loopback test is performed is described.

Figure 6:
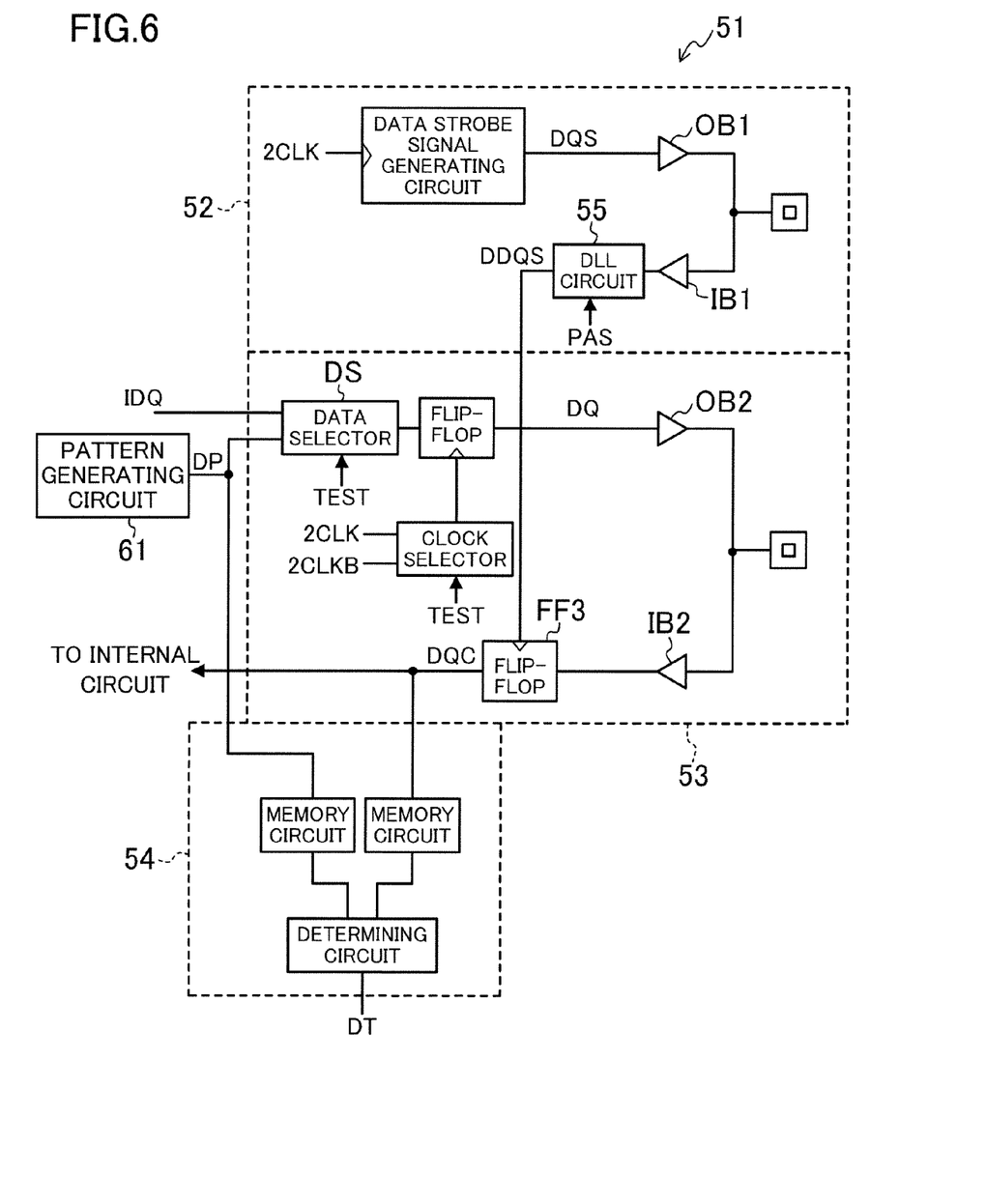
FIG. 6 is a diagram illustrating an example configuration of a conventional memory access system.

FIG. 6 is a diagram illustrating a configuration of a DDR-SDRAM interface circuit described as a conventional example in Japanese Patent Publication No. 2008-210487. A DDR-SDRAM interface circuit 51 of FIG. 6 has a normal operation mode in which a data signal DQ is communicated to a DDR-SDRAM and a test mode in which operation confirmation of the DDR-SDRAM interface circuit 51 itself is performed. When a test control signal TEST becomes high, the DDR-SDRAM interface circuit 51 is turned to a loopback test mode, and a data selector DS selects and outputs pattern data DP which is outputted from a pattern generating circuit 61. In this loopback test, in a data strobe signal input/output section 52, a data strobe signal DQS via an output buffer OB1 is looped back to be received by an input buffer IB1, and in a data signal input/output section 53, a data signal DQ via an output buffer OB2 is looped back to be received by an input buffer IB2. Then, using a data strobe signal DDQS via a DLL circuit 55, the looped-back data signal DQ is captured by a flip-flop FF3 of the data signal input/output section 53. In a determining section 54, whether captured data DQC and the data DP of an output source match each other or not is determined.

SUMMARY

In the conventional configuration of FIG. 6, however, since the pattern generating circuit 61 is provided for the loopback test, only adjustment depending on a particular pattern can be performed.

Moreover, under actual operating conditions, the timing relationship between the data signal and the data strobe signal varies with changes in temperature and voltage, etc. Therefore, even when timing adjustment is performed in the loopback test mode, a result of the adjustment is not necessarily optimal, and thus, a data transfer error might occur when actually accessing the memory.

To put it another way, if optimal timing adjustment is allowed under actual operating conditions, a power supply voltage can be appropriately set, so that reduction in power consumption of a circuit can be realized.

It is therefore an object of the present disclosure to allow appropriate adjustment of a timing relationship between signals when one of the signals is transferred in synchronization with edges of the other one of the signals to be performed under actual operating conditions in a memory controller configured to perform data input/output with a memory.

According to an embodiment of the present disclosure, a memory controller which performs data input/output with a memory includes a controller section configured to transmit/receive data to/from circuit blocks and generate and output a first signal and a second signal holding a predetermined phase relationship with the first signal, an error detecting section having a FIFO memory configured to receive as an input the second signal outputted from the controller section, and a memory I/F section configured to receive as inputs the first signal outputted from the controller section and the second signal outputted from the FIFO memory of the error detecting section, perform timing adjustment for the first and second signals, and output the first and second signals after the timing adjustment to the memory, the second signal outputted from the memory I/F section is outputted to the memory and is looped back to the error detecting section, and the error detecting section includes a data comparator configured to compare the looped-back second signal with the original second signal outputted from the FIFO memory and corresponding to the looped-back second signal.

According to this embodiment, the first signal and the second signal holding a predetermined phase relationship with the first signal are outputted from the controller section. The first signal is received by the memory I/F section, and the second signal is received by the memory I/F section via the FIFO memory of the error detecting section. The memory I/F section performs timing adjustment for the first and second signals to output them to the memory, while the second signal is also looped back to the error detecting section. In the error detecting section, the second signal looped back from the memory I/F section is compared with the original second signal outputted from the FIFO memory and corresponding to the looped-back second signal by the data comparator. By this comparison, whether an error has occurred while data is transferred to the memory or not can be determined. Furthermore, a pattern generating circuit is not provided for a loop back test, and a test under actual operating conditions is made possible. Moreover, defect detection in a write operation is possible, and thus, when a data transfer error occurs, identifying whether a defect has occurred in a write operation or a read operation is possible.

It is preferable that the error detecting section includes a register configured to store a comparison result of the data comparator.

Furthermore, it is preferable that the controller section outputs a block identifying signal indicating one of the circuit blocks which is an output source of the second signal to the error detecting section, and when the comparison result of the data comparator is mismatch, the error detecting section stores the block identifying signal with the comparison result in the register.

Thus, when an error is detected, the block identifying signal indicating the circuit block which is an output source of the second signal is stored in the register, and analysis on whether a defect has occurred in the memory controller or a detect is caused by an output from a particular circuit block is facilitated by monitoring stored data of the register.

As described above, according to the present disclosure, the occurrence of an error in an actual operating state which cannot be detected in a test using a particular data pattern can be detected. Furthermore, analysis on whether a cause of a defect is in the memory controller or in a particular circuit block is facilitated. Thus, a defect analysis time can be reduced and adjustment of timing relationship between signals can be appropriately performed, so that the design efficiency and quality of memory access systems can be increased.

DETAILED DESCRIPTION

Embodiments for implementing the present disclosure will be hereinafter described with reference to the accompanying drawings.

Figure 1:
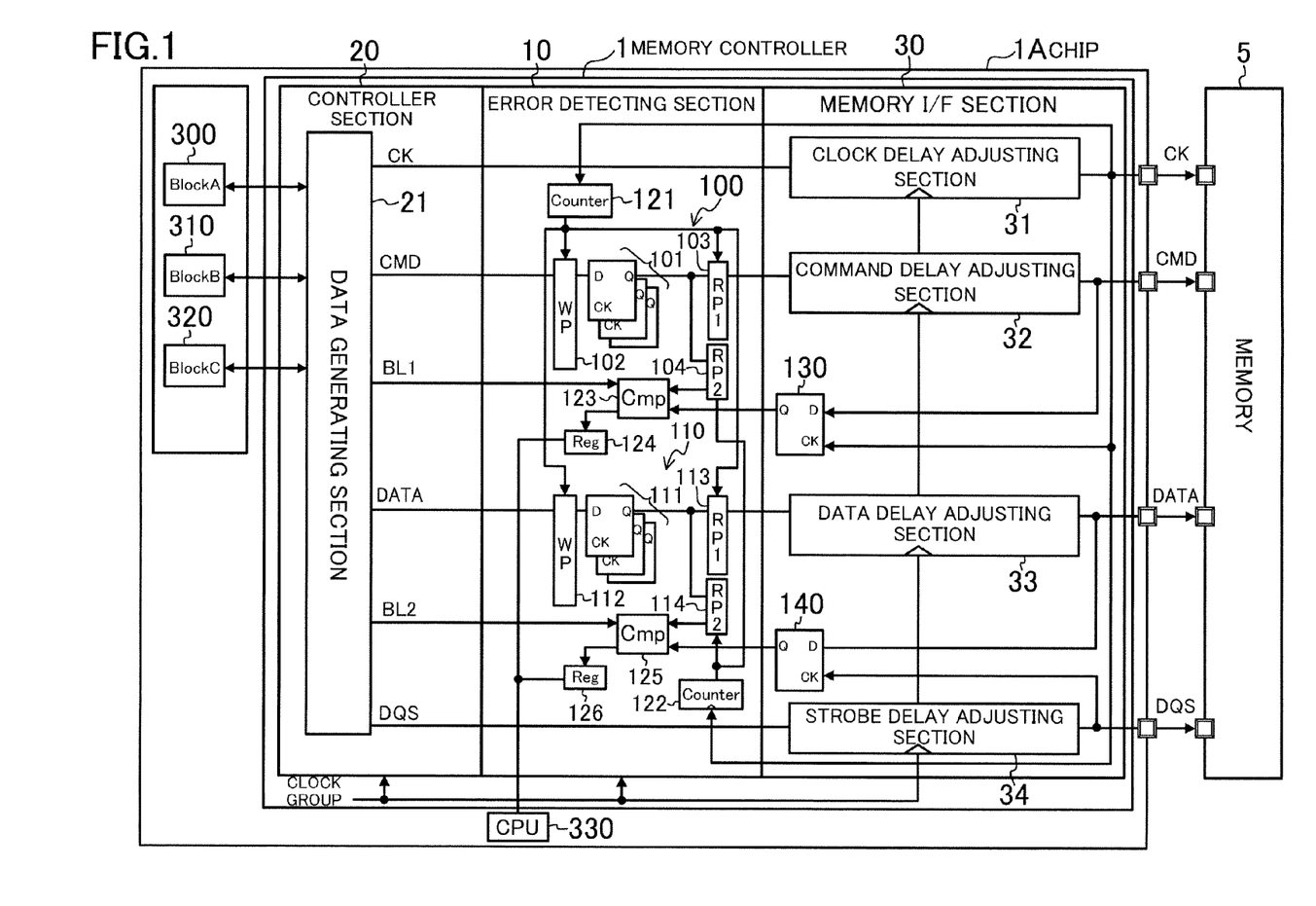
FIG. 1 is a block diagram illustrating a configuration of a memory access system according to an embodiment.

FIG. 1 is a block diagram illustrating a configuration of a memory access system according to an embodiment. In FIG. 1, a memory controller 1 is provided to perform data input/output with a memory 5 and has a function of transmitting/receiving data to/from a plurality of circuit blocks (BlockA300, BlockB310, and BlockC320) and transmitting/receiving data to/from the memory 5.

The memory controller 1 includes an error detecting section 10, a controller section 20, and a memory I/F section 30. In the controller section 20, a data generating section 21 performs to the plurality of circuit blocks (BlockA300, BlockB310, and BlockC320) control of data transmission/reception and arbitration such as prioritization of data transmission/reception. The memory controller 1 generates signals, i.e., a clock signal CK, a command signal CMD, a data signal DATA, and a data strobe signal DQS which comply with the DDR specification for transmitting data to the memory 5. The clock signal CK as a first signal and the command signal CMD as a second signal assure the AC specification for the memory 5 and are transferred. The command signal CMD holds a predetermined phase relationship with the clock signal CK. Similarly, the data strobe signal DQS as the first signal and the data signal DATA as the second signal assure the AC specification for the memory 5 and are transferred. The data signal DATA holds a predetermined phase relationship with the data strobe signal DQS. Also, the data generating section 21 generates a first block identifying signal BL1 indicating one of the circuit blocks which is an output source of the command signal CMD and a second block identifying signal BL2 indicating one of the circuit blocks which is an output source of the data signal DATA.

The error detecting section 10 includes a first FIFO memory 100 for receiving as an input the command signal CMD outputted from the controller section 20, a second FIFO memory 110 for receiving as an input the data signal DATA outputted from the controller section 20, and first and second counters 121 and 122 for controlling the first and second FIFO memories 100 and 110. Furthermore, the error detecting section 10 includes first and second data comparators 123 and 125 and first and second registers 124 and 126, which will be described later.

The first FIFO memory 100 includes a memory body 101 having storage areas of a plurality of stages, a write pointer (WP) 102, a first read pointer (RP1) 103, and a second read pointer (RP2) 104. The command signal CMD outputted from the controller section 20 is held in the memory body 101 according to a pointer value of the write pointer 102, is read out from the memory body 101 according to a pointer value of the first read pointer 103, and then, is outputted to the memory I/F section 30. The second read pointer 104 is used to read out the command signal CMD for error detection.

The second FIFO memory 110 includes a memory body 111 having storage areas of a plurality of stages, a write pointer (WP) 112, a first read pointer (RP1) 113, and a second read pointer (RP2) 114. The data signal DATA outputted from the controller section 20 is held in the memory body 111 according to a pointer value of the write pointer 112, is read out from the memory body 111 according to a pointer value of the first read pointer 113, and then, is outputted to the memory I/F section 30. The second read pointer 114 is used to read out the data signal DATA for error detection.

The first counter 121 controls the pointer values of the write pointer 102 and the first read pointer 103 of the first FIFO memory 100 and the pointer values of the write pointer 112 and the first read pointer 113 of the second FIFO memory 110. For example, each time when the command signal CMD is received by the first FIFO memory 100, the write pointer 102 is counted up, and each time when the data signal DATA is received by the second FIFO memory 110, the write pointer 112 is counted up. In this case, for example, the command signal CMD or the like may be used as an enable input of the first counter 121. The second counter 122 controls the pointer value of the second read pointer 104 of the first FIFO memory 100 and the pointer value of the second read pointer 114 of the second FIFO memory 110.

The memory I/F section 30 receives the clock signal CK outputted from the controller section 20 and the command signal CMD outputted from the first FIFO memory 100 of the error detecting section 10, performs AC timing adjustment complying with the DDR specification by a clock delay adjusting section 31 and a command delay adjusting section 32, and outputs adjusted signals to the memory 5. Also, the memory I/F section 30 receives the data signal DATA outputted from the second FIFO memory 110 of the error detecting section 10 and the data strobe signal DQS outputted from the controller section 20, performs AC timing adjustment complying with the DDR specification by a data delay adjusting section 33 and a strobe delay adjusting section 34, and outputs adjusted signals to the memory 5.

Figure 2A:
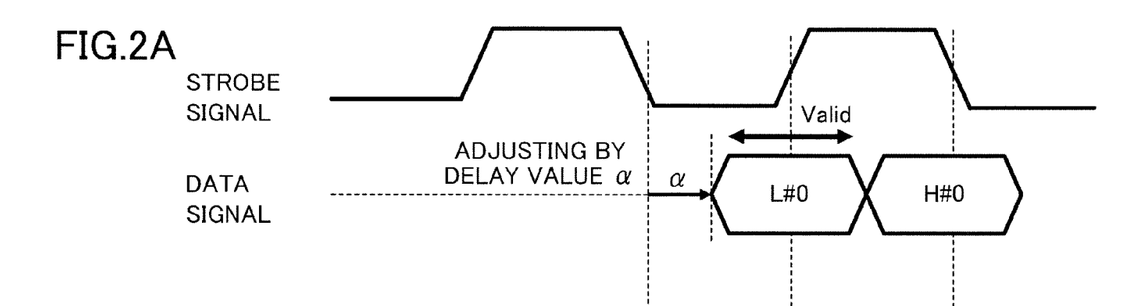
FIGS. 2A, 2B, and 2C are charts describing AC timing adjustment of a signal.
Figure 2B:
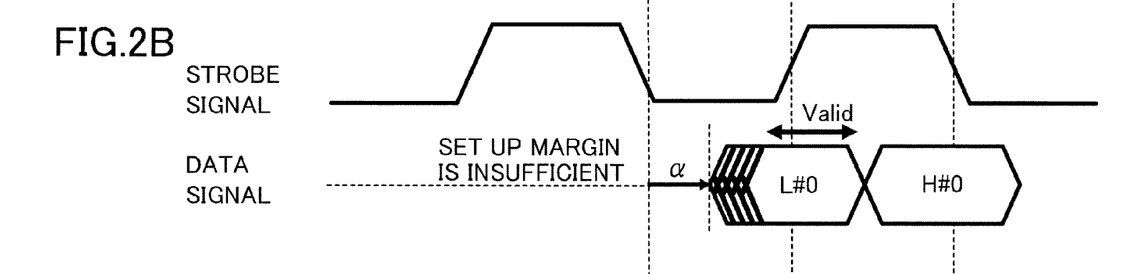
Figure 2C:
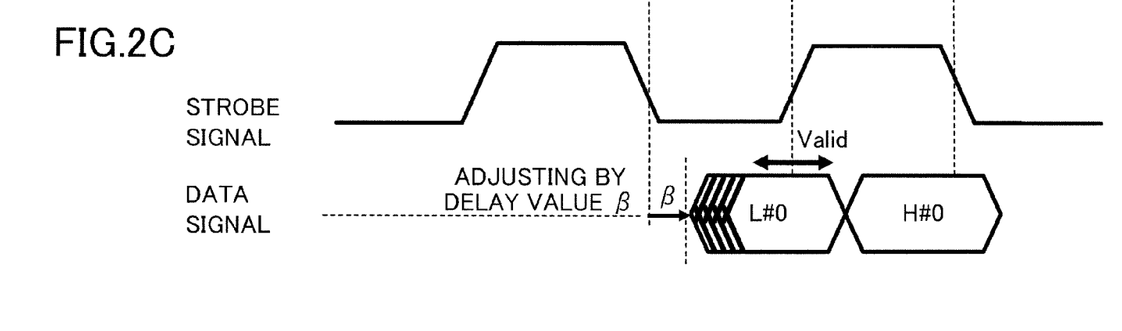

FIGS. 2A, 2B, and 2C illustrate an example of AC timing adjustment of the data signal and the data strobe signal. As shown in FIG. 2A, a timing of the data signal relative to a rising edge (or a falling edge) of the data strobe signal is adjusted by a delay value a. There might be cases where, as shown in FIG. 2B, for example, when a power supply voltage is lowered, a set up margin of the data signal is insufficient for the rising edge of the data strobe signal. In such a case, as shown in FIG. 2C, the delay value is changed to β (<α) to adjust the timing.

The memory I/F section 30 further includes first and second flip-flops 130 and 140 to perform loopback for error detection. The first flip-flop 130 receives as a D input the command signal CMD outputted from the command delay adjusting section 32 and as a CK input the clock signal CK outputted from the clock delay adjusting section 31. A Q output is returned to the error detecting section 10. That is, the command signal CMD outputted from the memory I/F section 30 is outputted to the memory 5 and also is looped back to the error detecting section 10. The second flip-flop 140 receives as a D input the data signal DATA outputted from the data delay adjusting section 33 and as a CK input the data strobe signal DQS outputted from the strobe delay adjusting section 34. A Q output is returned to the error detecting section 10. That is, the data signal DATA outputted from the memory I/F section 30 is outputted to the memory 5 and also is looped back to the error detecting section 10.

In the error detecting section 10, the first data comparator 123 compares the Q output of the first flip-flop 130, i.e., the looped-back command signal CMD with the original command signal CMD read out from the first FIFO memory 100 according to the second read pointer 104. The original command signal CMD corresponds to the looped-back command signal CMD. A comparison result by the first data comparator 123 is stored in the first register 124. In this embodiment, when the comparison result by the first data comparator 123 is "mismatch," a detection flag indicating the comparison result and the first block identifying signal BL1 indicating the circuit block which is an output source of the mismatch command signal CMD are stored in the first register 124. When the comparison result is mismatch, a data string of the mismatch command signal CMD may be stored in the first register 124. As another option, counting by the second counter 122 may be stopped. As still another option, counting by the first counter 121 may be stopped.

The second data comparator 125 compares the Q output of the second flip-flop 140, i.e., the looped-back data signal DATA with the original data signal DATA read out from the second FIFO memory 110 according to the second read pointer 114. The original data signal DATA corresponds to the looped-back data signal DATA. A comparison result by the second data comparator 125 is stored in the second register 126. In this embodiment, when the comparison result by the second data comparator 125 is "mismatch," a detection flag indicating the comparison result and the second block identifying signal BL2 indicating the circuit block which is an output source of the mismatch data signal DATA are stored in the second register 126. When the comparison result is mismatch, a data string of the mismatch data signal DATA may be stored in the second register 126. As another option, counting by the second counter 122 may be stopped. As still another option, counting by the first counter 121 may be stopped.

The memory access system of FIG. 1 further includes a CPU 330. Stored data of the first and second registers 124 and 126 can be monitored from the CPU 330. In the configuration of FIG. 1, the memory controller 1, the circuit blocks, and the CPU 330 are mounted on a single chip 1A.

Figure 3:
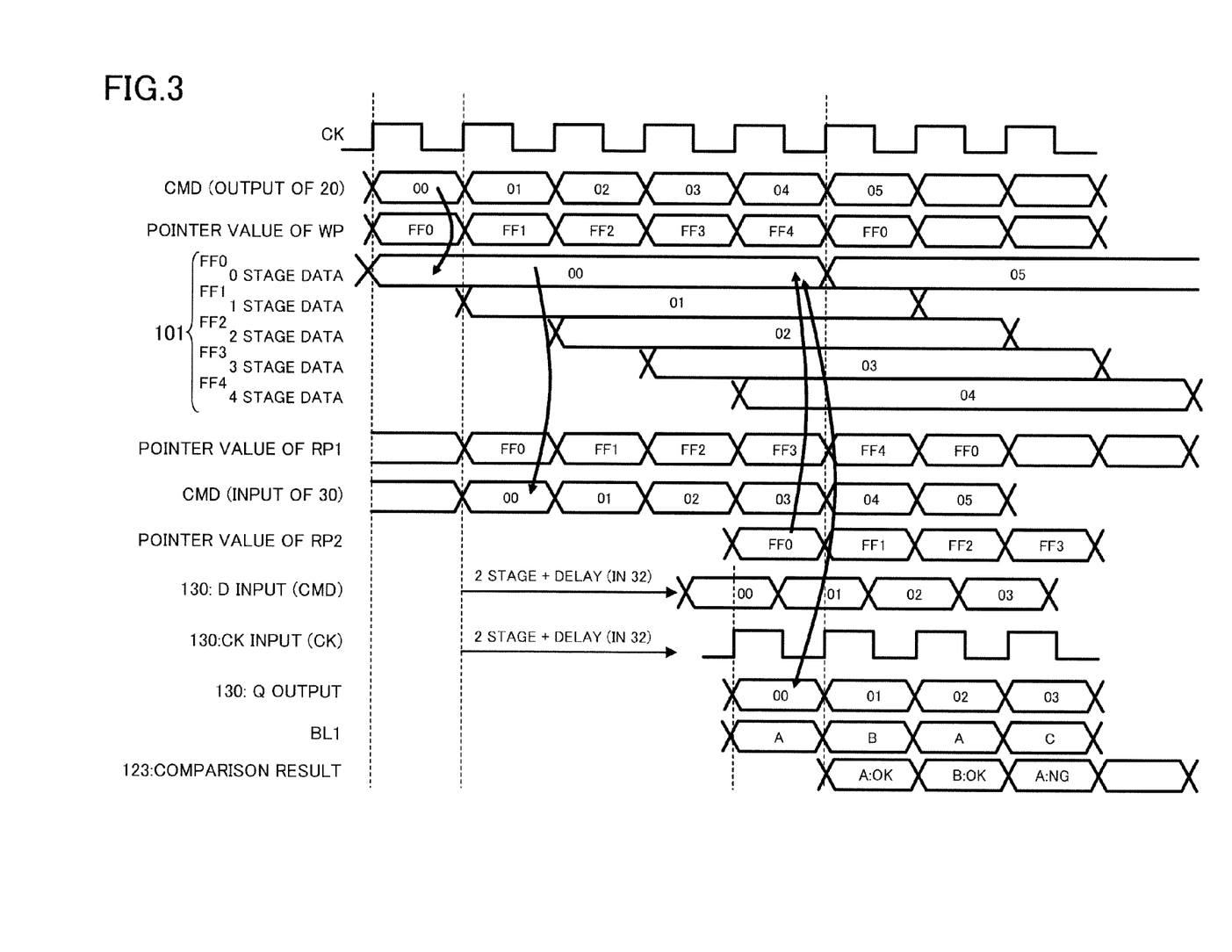
FIG. 3 is a timing chart illustrating the operation of the memory controller of FIG. 1.

The operation of the memory controller 1 of FIG. 1 will be described with reference to an operation timing chart of FIG. 3. In this operation, the memory controller 1 performs a write operation to the memory 5.

In the controller section 20, the data generating section 21 performs arbitration to the plurality of circuit blocks to generate the clock signal CK, the command signal CMD, and the first block identifying signal BL1. In the error detecting section 10, the generated command signal CMD is sequentially stored in the first FIFO memory 100 according to the pointer value of the write pointer (WP) 102. Note that, in FIG. 3, the memory body 101 of the first FIFO memory 100 includes flip-flops FF0-FF4 of five stages. The command signal CMD stored in the first FIFO memory 100 is sequentially read out according to the pointer value of the first write pointer (RP1) 103 to be received by the memory I/F section 30.

In the memory I/F section 30, AC timing adjustment is performed to the command signal CMD and the clock signal CK by the clock delay adjusting section 31 and the command delay adjusting section 32. The command signal CMD outputted from the command delay adjusting section 32 is transmitted to the memory 5 and is also given to the D input of the first flip-flop 130. The clock signal CK outputted from the clock delay adjusting section 31 is transmitted to the memory 5 and is also given to the CK input of the first flip-flop 130. The Q output of the first flip-flop 130, i.e., the looped-back command signal CMD is outputted to the error detecting section 10.

In the error detecting section 10, the first data comparator 123 compares the Q output of the first flip-flop 130, i.e., the looped-back command signal CMD with the original command signal CMD read out from the first FIFO memory 100 according to the pointer value of the second read pointer (RP2) 104. Note that, as shown in FIG. 3, an offset corresponding to a delay of the command signal CMD in the memory I/F section 30 is given to the pointer value of the second read pointer 104, as compared to the pointer value of the first read pointer 103. When a comparison result is mismatch, a detection flag indicating the comparison result and the first block identifying signal BL1 are stored in the first register 124.

Also, in the controller section 20, the data generating section 21 generates the data signal DATA, the data strobe signal DQS, and the second block identifying signal BL2. In the error detecting section 10, the generated data signal DATA is subsequently stored in the second FIFO memory 110 according to the pointer value of the write pointer 112. The data signal DATA stored in the second FIFO memory 110 is sequentially read out according to the pointer value of the first read pointer 113 to be received by the memory I/F section 30.

In the memory I/F section 30, AC timing adjustment is performed to the data signal DATA and the data strobe signal DQS by the data delay adjusting section 33 and the strobe delay adjusting section 34. Then, the data signal DATA outputted from the data delay adjusting section 33 is transmitted to the memory 5 and is also given to the D input of the second flip-flop 140. The data strobe signal DQS outputted from the strobe delay adjusting section 34 is transmitted to the memory 5 and is also given to the CK input of the second flip-flop 140.

Then, the Q output of the second flip-flop 140, i.e., the looped-back data signal DATA is outputted to the error detecting section 10.

In the error detecting section 10, the second data comparator 125 compares the Q output of the second flip-flop 140, i.e., the looped-back data signal DATA with the original data signal DATA read out from the second FIFO memory 110 according to the pointer value of the second read pointer 114. Then, when a comparison result is mismatch, a detection flag indicating the comparison result and the second block identifying signal BL2 are stored in the second register 126.

As a result of the above-described operation, analysis on whether a cause of a defect is in the memory controller 1 or in a particular circuit block can be facilitated by monitoring stored data of the first and second registers 124 and 126 from the CPU 330.

As described above, according to this embodiment, in the error detecting section 10, the command signal CMD looped back from the memory I/F section 30 is compared with the original command signal CMD outputted from the first FIFO memory 100 and corresponding to the looped-back command signal CMD by the first data comparator 123. Also, the data signal DATA looped back from the memory I/F section 30 is compared with the original data signal DATA outputted from the second FIFO memory 110 and corresponding to the looped-back data signal DATA by the second data comparator 125. By the above-described comparison, whether an error has occurred while data is transferred to the memory 5 or not can be determined. That is, a test under actual conditions, not a test using a particular data pattern, is made possible. Moreover, defect detection in a write operation is possible, and thus, when a data transfer error occurs, identifying whether a defect has occurred in a write operation or a read operation is possible.

Furthermore, since when an error is detected, the first block identifying signal BL1 indicating the circuit block which is an output source of the command signal CMD and the second clock identifying signal BL2 indicating the circuit block which is an output source of the data signal DATA are stored in the first and second registers 124 and 126, respectively, analysis on whether a defect has occurred in the memory controller 1 or a detect is caused by an output from a particular circuit block is facilitated by monitoring stored data of the registers 124 and 126.

Note that a configuration not using the block identifying signals BL1 and BL2 can be adopted. Furthermore, a configuration in which the registers 124 and 126 storing comparison results are not provided and comparison results of the data comparators 123 and 125 are outputted directly to the outside can be also adopted.

Figure 4:
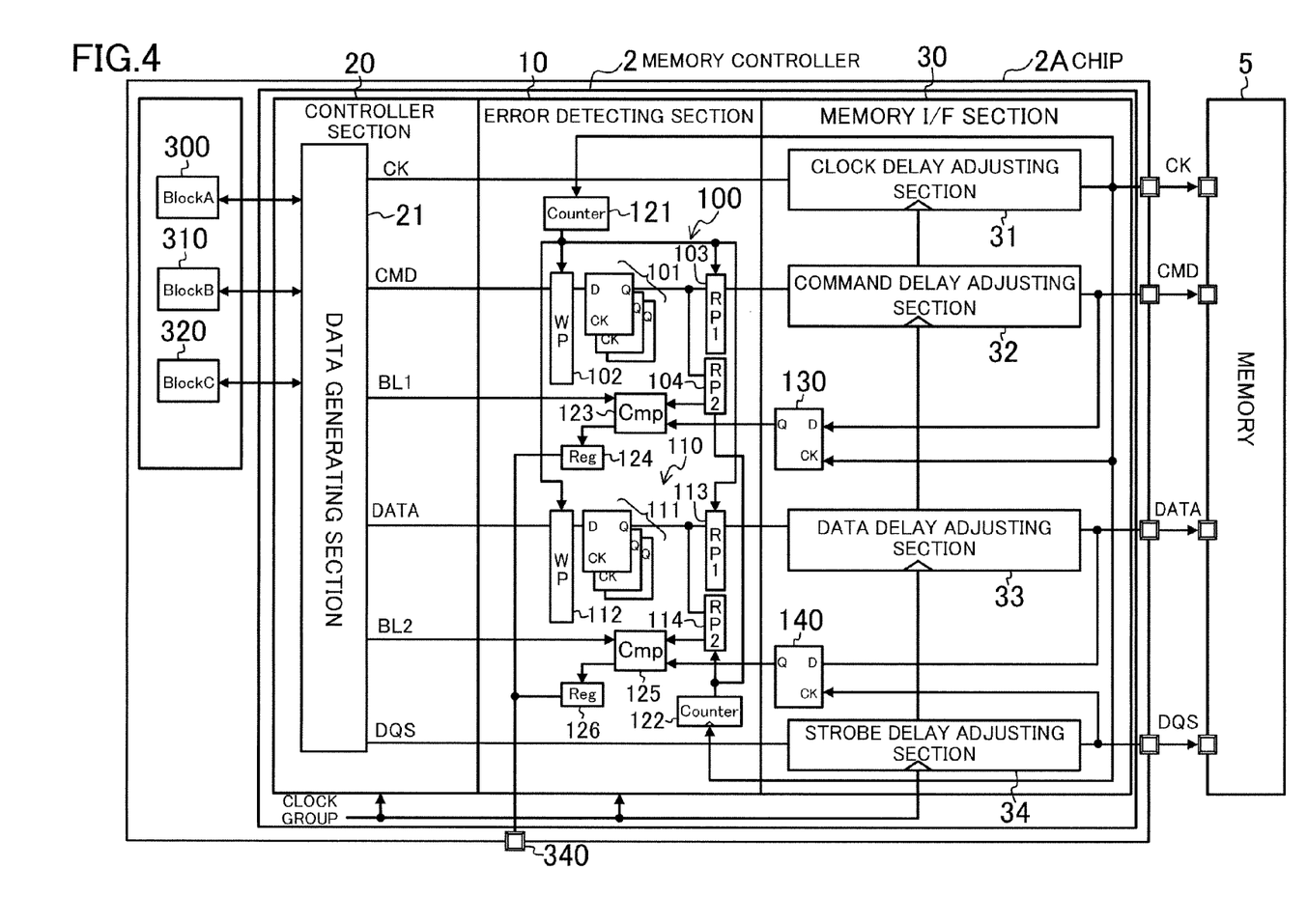
FIG. 4 is a block diagram illustrating a variation of the configuration of FIG. 1.

FIG. 4 illustrates a variation of the configuration of FIG. 1. In FIG. 4, elements common to those of FIG. 1 are assigned the same reference characters as those of FIG. 1, and the detailed description thereof will not be repeated. In a memory access system of FIG. 4, a memory controller 2 has substantially the same configuration as that of the memory controller 1 of FIG. 1, but is different from the memory controller 1 in that an external terminal 340 for externally monitoring stored data of the first and second registers 124 and 126 is provided, instead of the CPU 330. In the configuration of FIG. 4, the memory controller 2 and circuit blocks are mounted on a signal chip 2A. With the external terminal 340 provided, the stored data of the first and second registers 124 and 126, i.e., an error detection result can be externally monitored in a direct manner. Thus, even in a circuit configuration not including a CPU, a memory access operation can be confirmed, and therefore, the memory controller 2 can be mounted in various types of LSIs. Moreover, since stored data of the first and the second registers 124 and the 126 can be monitored on a real-time basis, analysis when a defect has occurred is facilitated.

Figure 5:
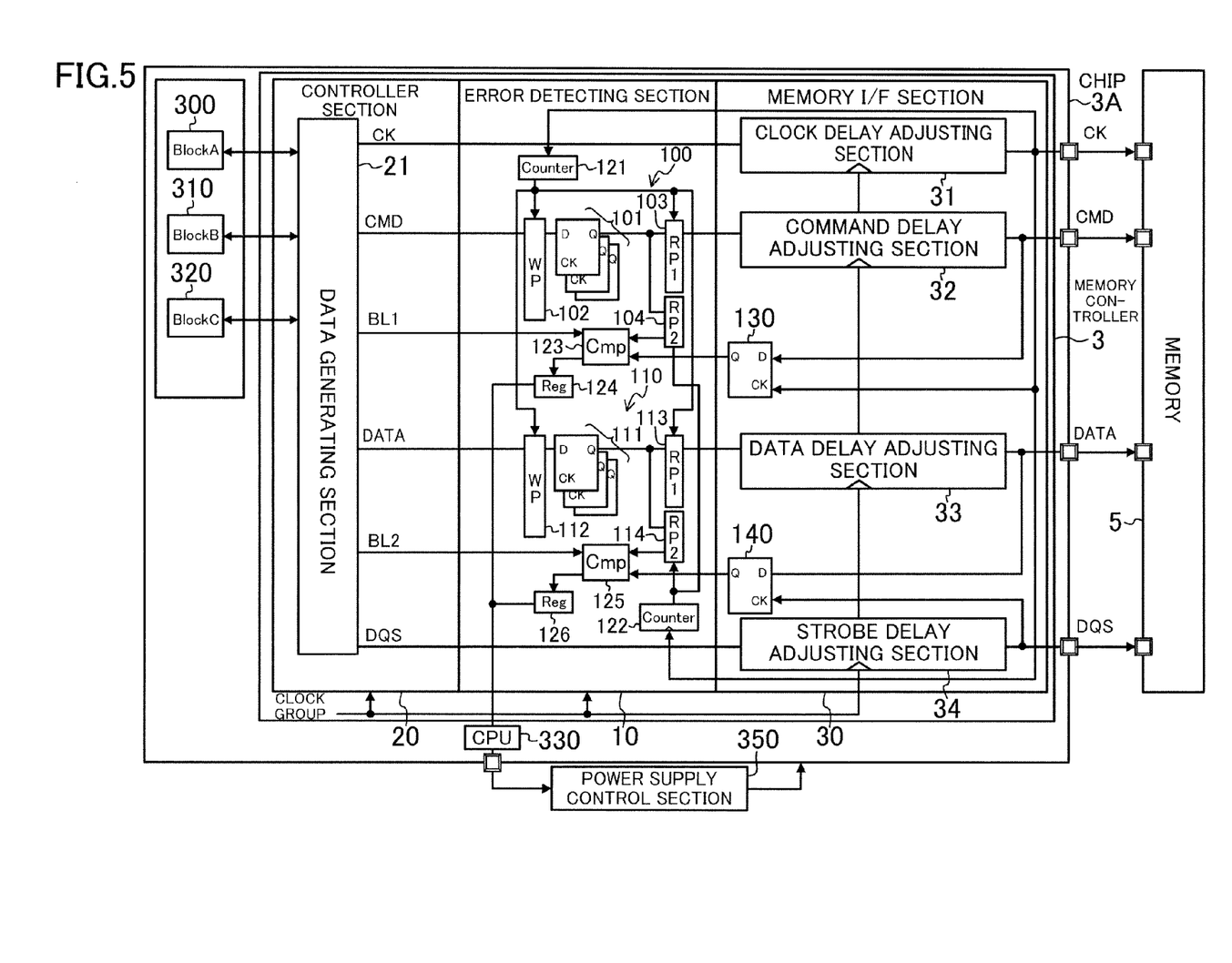
FIG. 5 is a block diagram illustrating another variation of the configuration of FIG.

FIG. 5 illustrates another variation of the configuration of FIG. 1. In FIG. 5, elements common to those of FIG. 1 are assigned the same reference numerals as those of FIG. 1, and the detailed description thereof will not be repeated. A memory controller 3 of FIG. 5 has substantially the same configuration as that of the memory controller 1 of FIG. 1, but is different from the memory controller 1 in that a power supply control section 350 for controlling a power supply voltage to be given to the memory controller 3 by control of the CPU 330 is further provided. In the configuration of FIG. 5, the memory controller 3, circuit blocks, and the CPU 330 are mounted on a single chip 3A.

Error detection data accumulated in the first and the second registers 124 and 126 are collected in the CPU 330 and are analyzed. Herein, for example, when no error has been detected when transferring data from any one of the circuit blocks and the memory controller 3 is considered to be normally operating, the CPU 330 outputs a control signal to lower the power supply voltage to the power supply control section 350. When an error is detected for the first time while the above-described power supply control operation is repeated, the power supply voltage at the detection of the error can be recognized as a boundary between a normal operation and a defective operation in this circuit. By obtaining a lower limit of the power supply voltage in the above-described manner, an optimal power supply margin can be set to reduce power consumption of the circuit.

Note that, in the foregoing description, a case where signals complying with the DDR specification are transmitted to a memory has been given as an example, but the scope of application of the present disclosure is not limited thereto.

In a memory controller according to the present disclosure, the occurrence of an error in an actual operating state can be detected, and a data signal timing during a normal memory access operation can be adjusted. Thus, the present disclosure is useful in application to, for example, a television set and a mobile device, etc. in which a higher speed performance is required.

What is claimed is:

1. A memory controller which performs data input/output with a memory, comprising:
   a controller section configured to transmit/receive data to/from circuit blocks and generate and output a first signal and a second signal holding a predetermined phase relationship with the first signal;
   an error detecting section having a FIFO memory configured to receive as an input the second signal outputted from the controller section; and
   a memory I/F section configured to receive as inputs the first signal outputted from the controller section and the second signal outputted from the FIFO memory of the error detecting section, perform timing adjustment for the first and second signals, and output the first and second signals after the timing adjustment to the memory,
   wherein the second signal outputted from the memory I/F section is outputted to the memory and is looped back to the error detecting section, and
   the error detecting section includes:
      a data comparator configured to compare the looped-back second signal with the original second signal outputted from the FIFO memory and corresponding to the looped-back second signal; and a register configured to store a comparison result of the data comparator, and wherein the controller section outputs a block identifying signal indicating one of the circuit blocks which is an output source of the second signal to the error detecting section, and when the comparison result of the data comparator is mismatch, the error detecting section stores the block identifying signal with the comparison result in the register.

2. The memory controller of claim 1, wherein the first signal is a clock signal and the second signal is a command signal.

3. The memory controller of claim 1, wherein the first signal is a data strobe signal and the second signal is a data signal.

4. A memory access system, comprising:

the memory controller of claim 1; and an output terminal configured to externally monitor stored data of the register of the memory controller.

5. A memory access system, comprising:

the memory controller of claim 1; and a CPU configured to monitor stored data of the register of the memory controller.

6. The memory access system of claim 5, further comprising:

a power supply control section configured to control a power supply voltage to be given to the memory controller by control of the CPU.

* * * * *